United States Patent
Iwazawa

(10) Patent No.: US 7,176,646 B2
(45) Date of Patent: Feb. 13, 2007

(54) ELECTRIC POWER STEERING APPARATUS AND ELECTRICITY SUPPLY SYSTEM

(75) Inventor: Masahide Iwazawa, Aichi (JP)

(73) Assignees: Favess Co., Ltd., Okazaki (JP); Toyoda Koki Kabushiki Kaisha, Kariya (JP); Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 11/252,785

(22) Filed: Oct. 19, 2005

(65) Prior Publication Data

US 2006/0087269 A1 Apr. 27, 2006

(30) Foreign Application Priority Data

Oct. 22, 2004 (JP) ............................. 2004-308159

(51) Int. Cl.
*H02P 7/00* (2006.01)
(52) U.S. Cl. ...................................... 318/432; 318/139
(58) Field of Classification Search ...................... None
See application file for complete search history.

(56) References Cited

U.S. PATENT DOCUMENTS

| | | | |
|---|---|---|---|
| 5,416,702 A | 5/1995 | Kitagawa et al. | |
| 6,795,756 B1 * | 9/2004 | Zhang et al. | 701/22 |
| 6,973,992 B2 * | 12/2005 | Yoneda et al. | 180/446 |
| 2004/0164560 A1 | 8/2004 | Odahara et al. | |
| 2004/0212351 A1 | 10/2004 | Kneifel et al. | |
| 2005/0077867 A1 * | 4/2005 | Cawthorne et al. | 320/104 |

FOREIGN PATENT DOCUMENTS

| | | |
|---|---|---|
| EP | 1 322 028 A2 | 6/2003 |
| JP | 2002-186120 | 6/2002 |
| WO | WO 03/004315 A2 | 1/2003 |

* cited by examiner

*Primary Examiner*—Lincoln Donovan
*Assistant Examiner*—Erick Glass
(74) *Attorney, Agent, or Firm*—Oblon, Spivak, McClelland, Maier & Neustadt, P.C.

(57) ABSTRACT

A transformer section transforms a primary voltage and outputs secondary voltage. A control section inputs a first signal indicating a state of electricity supply of a primary power source through an in-vehicle network. The transformer section outputs a second signal indicating a state of electricity supply of the transformer section. When the input of the first signal is disrupted, the control section limits the driving electricity supplied to the steering motor based on at least one of a value of the secondary voltage and the electricity supply state of the transformer section indicated by the second signal. Accordingly, driving electricity is stably supplied with the steering motor with a simple configuration even if the input of the first signal is disrupted due to a failure in the in-vehicle network.

6 Claims, 3 Drawing Sheets

ELECTRIC POWER STEERING APPARATUS AND ELECTRICITY SUPPLY SYSTEM

CROSS-REFERENCE TO RELATED APPLICATIONS

This application is based upon and claims the benefit of priority from prior Japanese Patent Application No. 2004-308159, filed on Oct. 22, 2004, the entire contents of which are incorporated herein by reference.

BACKGROUND OF THE INVENTION

The present invention relates to an electric power steering apparatus and an electricity supply system.

In recent years, various types of electric components and electronic control systems for vehicles have been introduced. In-vehicle networks for connecting a plurality of control devices with control lines, such as a controller area network (CAN) have been applied to an increased number of cars. This prevents the wiring from being complicated and allows control devices of various types of actuators to communicate with each other and share information. Also, the CAN permits the control devices to be integrally controlled.

Electric cars, fuel cell cars, and hybrid cars that switch between engine drive and motor drive according to the condition, have, as a vehicle power source, a high-voltage battery that generates high-voltage for actuating the motor for driving the vehicle. Such a high-voltage vehicle has a DC/DC converter. The DC/DC converter uses the voltage of the high-voltage battery as a primary voltage, and steps down the primary voltage to obtain a secondary voltage. An electric power steering apparatus (EPS) installed in a high-voltage vehicle receives driving electricity based on the secondary voltage.

Normally, such a high-voltage vehicle has a host ECU that monitors the state of electricity supply by the high-voltage battery. The host ECU, for example, monitors the voltage supplied of the high-voltage battery. The host ECU inputs a checking signal indicating the state of electricity supply of the high-voltage battery to an EPSECU through the in-vehicle network. Based on the inputted checking signal, the EPSECU, which controls an EPS, supplies driving electricity to an EPS actuator. When the checking signal indicates an abnormality of the high-voltage battery, the EPSECU stops the supply of driving electricity to the EPS actuator. That is, the EPSECU stops power assist control.

However, in a vehicle where various types of actuators are controlled based on mutual communication through an in-vehicle network, a failure in the in-vehicle network can disrupt the input of various types of signals required for various types of control. When the input of the signal is disrupted, the EPSECU cannot determine whether there is an abnormality in a high-voltage battery or the DC/DC converter. In this case, to make the system fail safe, the EPSECU must stop the power assist control even if there is no abnormality in the high-voltage battery and the DC/DC converter.

Conventionally, Japanese Laid-Open Patent Publication No. 2002-186120 discloses a technology for solving these problems. The disclosed technology provides a bypass circuit forming a closed loop to establish redundant control lines connecting the control devices. When an abnormality occurs in any of the control lines forming the in-vehicle network, a bypass line is automatically established. This configuration prevents disruption of signals due to a failure of the in-vehicle network, thereby improving the reliability of control signals.

However, if a complete redundancy of control lines is established by making control lines forming the in-vehicle network redundant as in the above configuration of the bypass lines, the extended total length of the lines increases the manufacturing costs. Also, to avoid the complexity of wiring due to redundant control lines, the wiring layout of control lines needs to be newly designed, which further increases the costs.

SUMMARY OF THE INVENTION

Accordingly, it is an objective of the present invention to provide an electric power steering apparatus and an electricity supply system that have simple configuration and are capable of stably supplying driving electricity even if the input of checking signals indicating the state of a vehicle power supply is disrupted due to a failure in an in-vehicle network.

To achieve the above-mentioned objective, the present invention provides an electric power steering apparatus. The steering apparatus is installed in a vehicle having a primary power source that generates primary voltage. The vehicle has a steering system and an in-vehicle network for communicating information. The electric power steering apparatus includes a steering force assisting device that supplies assisting force for assisting steering operation to the steering system. The assisting device has a steering motor serving as a driving source of the assisting force. A transformer section transforms the primary voltage and outputs secondary voltage. A control section controls the steering force assisting device by supplying driving electricity based on the secondary voltage to the steering motor. The control section inputs a first signal indicating a state of electricity supply of the primary power source through the in-vehicle network. The control section supplies driving electricity to the steering motor based on the first signal. The transformer section outputs a second signal indicating a state of electricity supply of the transformer section. When the input of the first signal is disrupted, the control section limits the driving electricity supplied to the steering motor based on at least one of a value of the secondary voltage and the electricity supply state of the transformer section indicated by the second signal.

Further, the present invention provides an electricity supply system installed in a vehicle. The vehicle has a primary power source that generates primary voltage. The vehicle further has a motor and an in-vehicle network for communicating information. The system includes a transformer section that transforms the primary voltage and outputs secondary voltage. A monitoring section monitors a state of electricity supply of the primary power source. The monitoring section outputs, to the in-vehicle network, a first signal indicating the electricity supply state of the primary power source. A control section that supplies driving electricity based on the secondary voltage to the motor. The control section inputs a first signal through the in-vehicle network. The control section supplies driving electricity to the motor based on the first signal. The transformer section outputs a second signal indicating a state of electricity supply of the transformer section. When the input of the first signal is disrupted, the control section limits the driving electricity supplied to the motor based on at least one of a value of the secondary voltage and the electricity supply state of the transformer section indicated by the second signal.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Hereinafter, an electric power steering apparatus (EPS) for a high-voltage vehicle according to a preferred embodiment of the present invention will be described with reference to the drawings.

Figure 1:
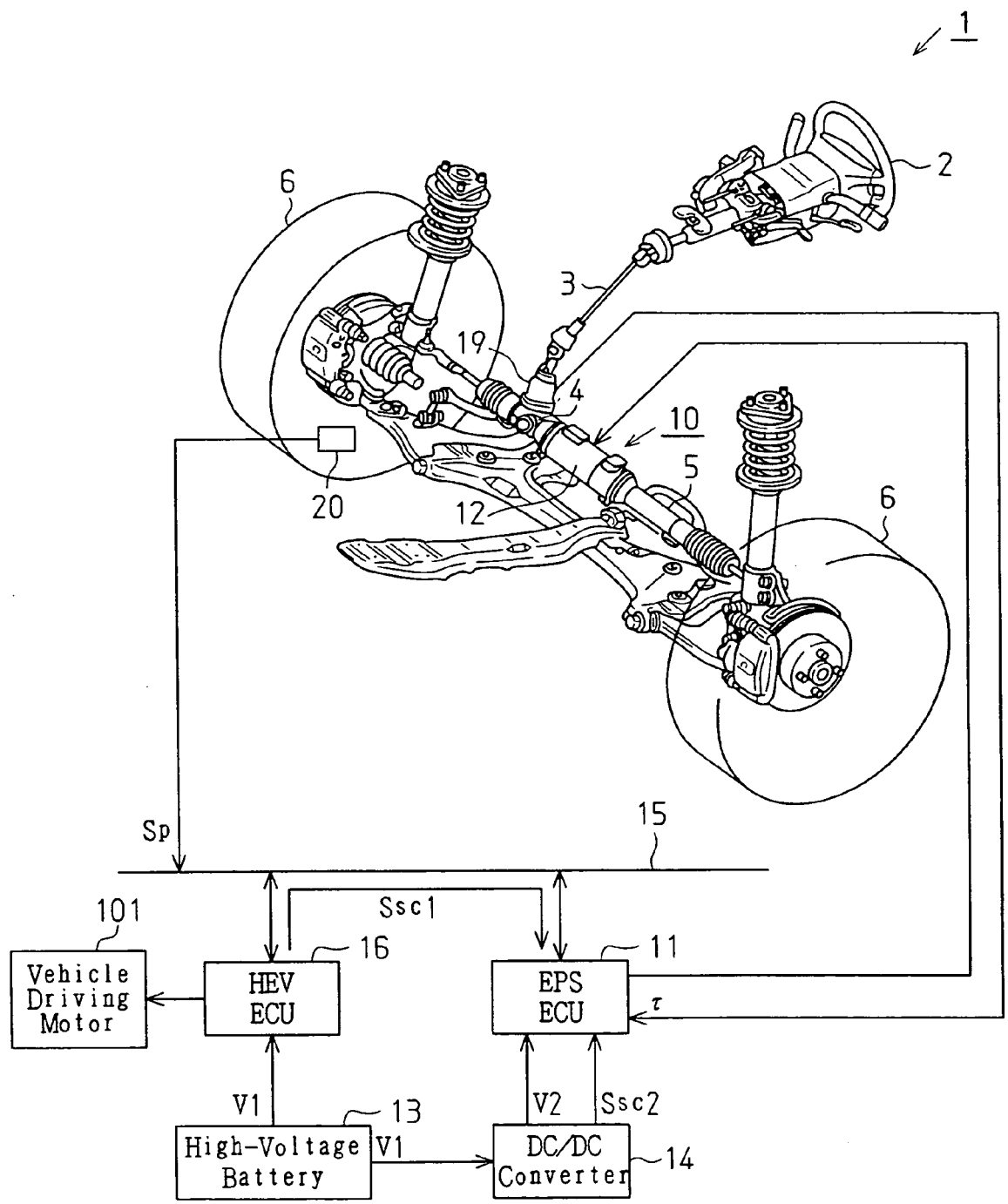
FIG. 1 is a diagrammatic view illustrating an electric power steering apparatus according to one embodiment of the present invention.

FIG. 1 is a schematic view illustrating an EPS 1 according to the present embodiment. As shown in FIG. 1, a steering shaft 3 extending from a steering wheel 2 is coupled to a rack 5 with a rack-and-pinion mechanism 4. Rotation of the steering shaft 3 accompanying a steering operation of the steering wheel 2 is converted into linear reciprocation of the rack 5 by means of the rack-and-pinion mechanism 4. According to the linear reciprocation of the rack 5, the angle of steered wheels 6, that is, the steered wheel angle, is changed. This in turn changes the traveling direction of the vehicle. The steering wheel 2, the steering shaft 3, the rack-and-pinion mechanism 4, and the rack 5 form a steering system of the vehicle.

The EPS 1 includes an EPS actuator 10 and an EPSECU 11. The EPS actuator 10 functions as a steering force assisting device that supplies assisting force for assisting steering operation to the steering system. The EPSECU 11 functions as a control section for controlling operation of the EPS actuator 10.

The EPS actuator 10 includes an EPS motor 12. The EPS actuator 10 of this embodiment is a rack type EPS apparatus, in which the EPS motor 12 serving as a driving source is arranged coaxial with the rack 5. Assist torque generated by the EPS motor 12 is transmitted to the rack 5 through a ball screw mechanism (not shown). The EPS motor 12 in this embodiment is a brushless motor that rotates when receiving driving electricity of three phases, or currents of U-phase, V-phase, and W-phase. The EPSECU 11 controls assisting force applied to the steering system by controlling the assist torque generated by the EPS motor 12 (power assist control).

Next, the control of the EPS and the electricity supply system according this embodiment will be described.

The EPS 1 of this embodiment is used in a high-voltage vehicle such as an electric car, a fuel cell car, and a hybrid car that has a battery 13 as a vehicle power source. The battery 13 has an output voltage higher than the driving voltage of the EPS motor 12. A primary voltage V1 outputted by the high-voltage battery 13 is transformed (stepped down) to a secondary voltage V2 by a DC/DC converter 14 functioning as a transformer section, and is supplied to the EPSECU 11. Based on the secondary voltage V2 from the DC/DC converter 14, the EPSECU 11 supplies the three-phase driving electricity to the EPS motor 12.

The vehicle of this embodiment is a hybrid car, and the primary voltage V1 outputted by the high-voltage battery 13 is set to approximately 245V (or 288V). The DC/DC converter 14 steps down the primary voltage V1 to the secondary voltage V2 of 42V, and supplies the secondary voltage V2 to the EPSECU 11.

The vehicle has an in-vehicle network 15, which functions as a controller area network (CAN). The EPSECU 11 is connected to an HEVECU 16, which is a host control unit of the hybrid car, by means of the in-vehicle network 15. The HEVECU 16 controls a vehicle driving motor 101. The HEVECU 16 functions as a monitoring section that monitors the state of the high-voltage battery 13. Specifically, the HEVECU 16 monitors, for example, the value of the output voltage of the high-voltage battery 13. Based on the monitoring results, the HEVECU 16 generates a first signal Ssc1 that indicates the state of electricity supply of the high-voltage battery 13 to the vehicle driving motor 101 and the EPS motor 12. That is, the first signal Ssc1 functions as a signal used for checking the electricity supply state of the high-voltage battery 13, or the primary power source, for example to the vehicle driving motor 101. The first signal Ssc1 is inputted to the EPSECU 11 through the in-vehicle network 15. Based on the first signal Ssc1, the EPSECU 11 supplies driving electricity to the EPS motor 12, that is, performs power assist control.

Figure 2:
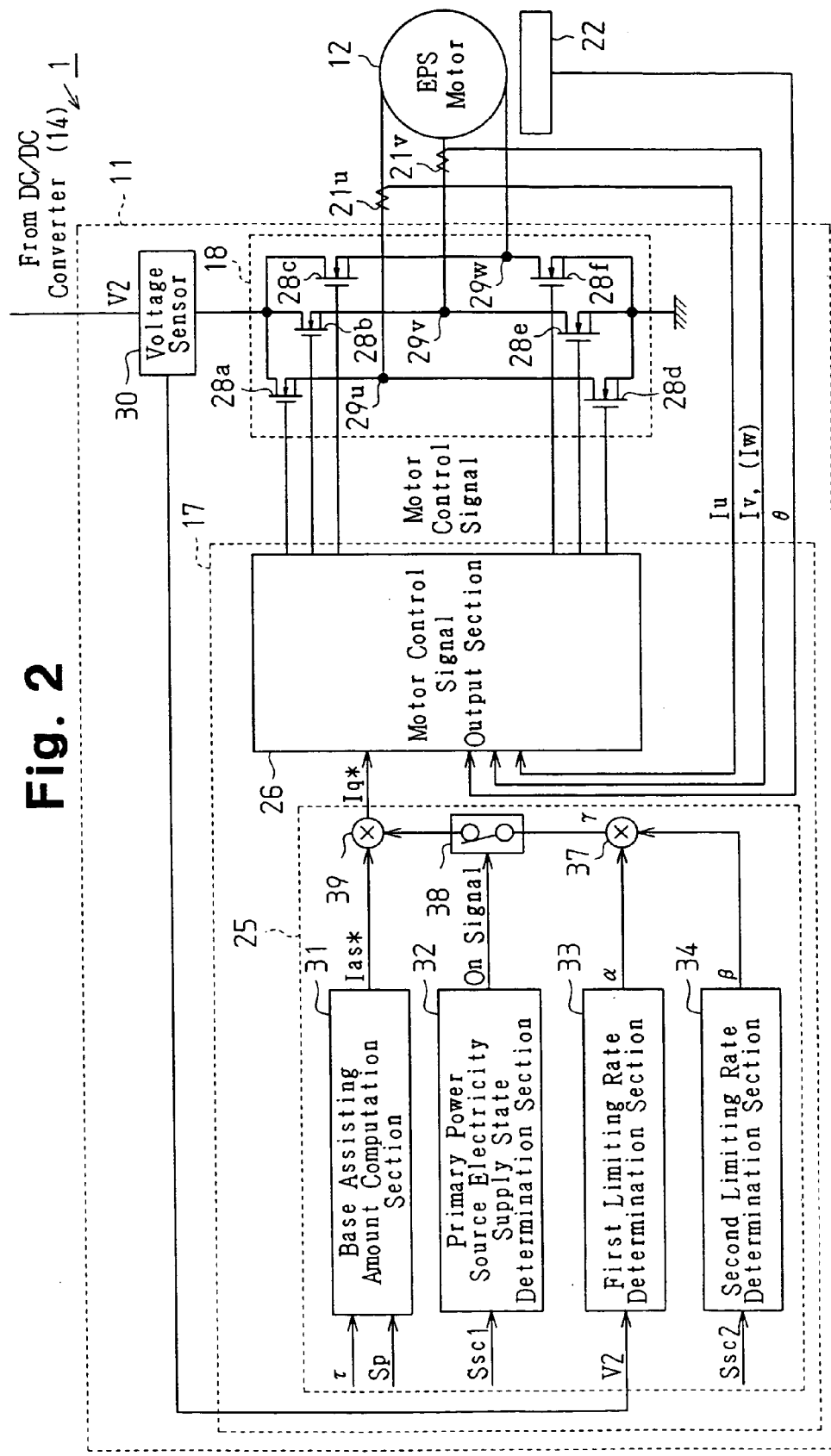
FIG. 2 is a diagrammatic view showing an electricity supply system in the EPS shown in FIG. 1.

As shown in FIG. 2, the EPSECU 11 has a microcomputer 17 that outputs a motor control signal, and a drive circuit 18 that supplies three-phase driving electricity to the EPS motor 12 based on the motor control signal.

As shown in FIG. 1, the EPSECU 11 is connected to a torque sensor 19 and a vehicle speed sensor 20. The microcomputer 17 detects a steering torque τ and a vehicle speed Sp based on output signals of these sensors 19, 20. In this embodiment, vehicle speed sensor 20 is connected to the EPSECU 11 through the in-vehicle network 15. As shown in FIG. 2, the EPSECU 11 is connected to two current sensors 21u, 21v for detecting three-phase current values Iu, Iv, Iw supplied to the EPS motor 12, and a rotation angle sensor 22 for detecting the rotation angle (electrical angle) θ of the EPS motor 12. The microcomputer 17 outputs a motor control signal to the drive circuit 18 based on the three-phase current values Iu, Iv, Iw and the rotation angle θ of the EPS motor 12 detected based on output signals from these sensors 19, 20, 21u, 21v, 22, the steering torque τ, and the vehicle speed Sp.

As shown in FIG. 2, the microcomputer 17 includes a current command value computation section 25 and a control signal output section 26. The current command value computation section 25 computes a current command value Iq*, which is a target control amount of the assisting force applied to the steering system. The control signal output section 26 outputs the motor control signal to the drive circuit 18 based on the current command value Iq* computed by the current command value computation section 25.

The current command value computation section 25 computes a current command value Iq* based on the steering torque τ and the vehicle speed Sp detected by the torque sensor 19 and the vehicle speed sensor 20, and sends the current command value Iq* to the control signal output section 26. In addition to the current command value Iq* computed by the current command value computation section 25, the control signal output section 26 inputs the three-phase current values Iu, Iv, Iw detected by the sensor 21u, 21v and the rotation angle θ detected by the rotation angle sensor 22. To cause the amount of current supplied to the EPS motor 12 (actual current value) to seek the current command value Iq*, or the target control amount, the control signal output section 26 outputs the motor control signal based on the three-phase current values Iu, Iv, Iw and the rotation angle θ.

In this embodiment, the control signal output section 26 converts the detected three-phase current values Iu, Iv, Iw into d, q-axes current values of a d/q coordinate system (d/q conversion), thereby performing the current feedback control.

That is, the current command value Iq* is inputted to the control signal output section 26 as a q axis current command value, and the control signal output section 26 subjects the three-phase current values Iu, Iv, Iw to d/q conversion based on the rotation angle θ. Subsequently, based on the d, q-axes current values and the q-axis current command value, the control signal output section 26 computes d, q-axes voltage command values, and subjects the d, q-axes voltage command values to d/q inversion, thereby computing the voltage command values for each phase. Based on the voltage command values, the control signal output section 26 generates a motor control signal and outputs the signal to the drive circuit 18. The drive circuit 18 is formed of six power MOSFETs (hereinafter, simply referred to as FETs), to correspond to the number of three-phase currents of the EPS motor 12. More specifically, the drive circuit 18 is formed of a first series circuit including first and fourth FETs 28a, 28d, a second series circuit including second and fifth FETs 28b, 28e, and a third series circuit including third and sixth FETs 28c, 28f, which are connected to one another in parallel. A node 29u of the first and fourth FETs 28a, 28d is connected to a U-phase coil of the EPS motor 12. A node 29v of the second and fifth FETs 28b, 28e is connected to a V-phase coil of the EPS motor 12. A node 29w of the third and sixth FETs 28c, 28f is connected to a W-phase coil of the EPS motor 12. The motor control signal outputted by the microcomputer 17 is applied to the gate terminals of the first to sixth FETs 28a to 28f. In response to the motor control signal, the first to sixth FETs 28a to 28f are ON/OFF controlled. This converts direct-current voltage (the secondary voltage V2) supplied from the DC/DC converter 14 to the drive circuit 18 into three-phase driving electricity, and the three-phase driving electricity is supplied to the EPS motor 12.

(Power Assist Control in a State where the Input of the First Signal Ssc1 For Checking the Electricity Supply State of the Primary Power Source is Disrupted)

When the input of the first signal Ssc1, which is a checking signal indicating the electricity supply state of the high-voltage battery 13, is disrupted due to a failure of the in-vehicle network 15, the EPSECU 11 cannot check whether there is an abnormality even if there is no abnormality in the high-voltage battery 13 and the DC/DC converter 14. Therefore, to make the system fail safe, a conventional EPSECU must stop power assist control regardless whether there is an abnormality in the high-voltage battery 13 and the DC/DC converter 14. However, if the power assist control is stopped at the same time as the disruption of the first signal Ssc1, or a checking signal, the steering feel may be extremely degraded. For example, the driver may feel a sudden increase of the steering load.

In this respect, when the input of the first signal Ssc1 is disrupted due to a failure in the in-vehicle network 15, that is, when the EPSECU 11 does not receive the first signal Ssc1, the EPS 1 of this embodiment limits the driving electricity supplied to the EPS motor 12 to continue the power assist control.

Specifically, as shown in FIG. 1, the DC/DC converter 14 of this embodiment outputs a second signal Ssc2 to the EPSECU 11. The second signal Ssc2 includes status information indicating a state where the DC/DC converter 14, which is a secondary power source, supplies electricity based on the secondary voltage V2, to the EPS motor 12. Also, as shown in FIG. 2, the EPSECU 11 includes a voltage sensor 30. The voltage sensor 30 functions as a detection section that detects the value of the secondary voltage V2 supplied by the DC/DC converter 14. When the input of the first signal Ssc1 is disrupted, the EPSECU 11 limits the driving electricity of the EPS motor 12 based on the value of the secondary voltage V2 detected by the voltage sensor 30 and the electricity supply state of the DC/DC converter 14 indicated by the second signal Ssc2. The EPSECU 11 supplies the limited driving electricity to the EPS motor 12.

Specifically, the current command value computation section 25 includes a base assisting amount computation section 31 and a determination section 32. The base assisting amount computation section 31 computes a base target control amount of the assisting force applied to the steering system, or a base assisting amount Ias*, based on the steering torque 1 and the vehicle speed Sp. The base assisting amount Ias* is a base element of the current command value Iq*. The determination section 32 determines whether it has received the first signal Ssc1 to determine a state where the high-voltage battery 13, which is the primary power source, supplies electricity to the vehicle driving motor 101.

The current command value computation section 25 includes a first determination section 33 and a second determination section 34. The first determination section 33 determines a first limiting rate α based on the value of the detected secondary voltage V2. The second determination section 34 determines a second limiting rate β based on the electricity supply state of the DC/DC converter 14 indicated by the second signal Ssc2. When the determination section 32 determines that the input of the first signal Ssc1 is disrupted, the current command value computation section 25 multiplies the base assisting amount Ias* computed by the base assisting amount computation section 31 by the first limiting rate α determined by the first determination section 33 and the second limiting rate β determined by the second determination section 34, thereby computing the current command value Iq*. The current command value computation section 25 outputs the current command value Iq* to the control signal output section 26.

Figure 3:
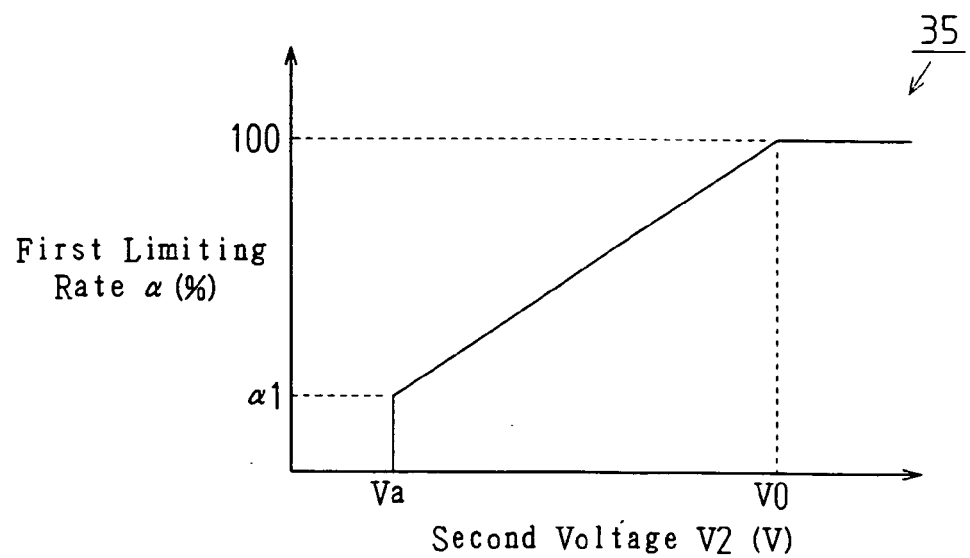
FIG. 3 is a diagrammatic view of a first map showing the relationship between a first limiting rate α and a secondary voltage.

More specifically, the first determination section 33 has a first map 35 shown in FIG. 3, in which the first limiting rate α is correlated to the value of the secondary voltage V2. In the first map 35, the greater the degree by which the value of the secondary voltage V2 is less than a default value V0, the lower the first limiting rate α becomes. That is, the current command value Iq* decreases when limited with the first limiting rate α. The operation will now be described. The default value V0 of the secondary voltage is set to correspond to the state where the first limiting rate α=100%. When the detected secondary voltage V2 is less than the default value V0, the first limiting rate α linearly decreases in proportion to the value of the secondary voltage V2 to a limiting rate α1 (0%<α1<100%) that corresponds to a predetermined voltage Va (0<Va<V0). When the detected secondary voltage V2 is less than the predetermined voltage Va, the first limiting rate α=0%. The first determination section 33 determines the first limiting rate α by checking the value of the detected secondary voltage V2 against the first map 35.

Figure 4:
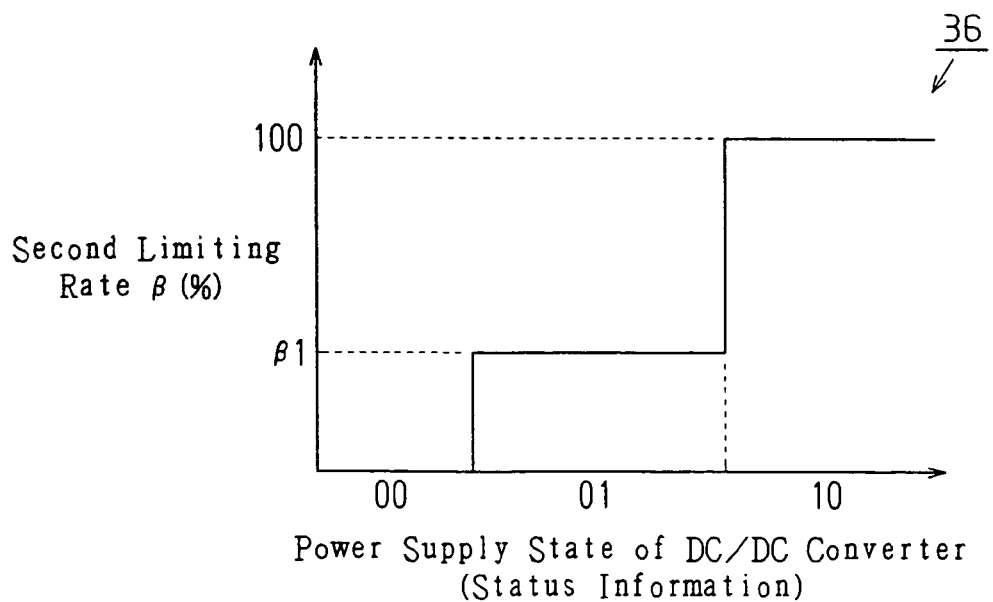
FIG. 4 is a diagrammatic view of a second map showing the relationship between a second limiting rate β and the state of power supply of a DC/DC converter.

Likewise, the second determination section 34 has a second map 36 shown in FIG. 4, in which the second limiting rate β is correlated to the electricity supply state of the DC/DC converter 14 indicated by the second signal Ssc2. In this embodiment, the electricity supply state of the DC/DC converter 14 is represented by two-bit status information. In the second map 36, the second limiting rate β is set for each zone of the two-bit status information. Specifically, during normal operation of the DC/DC converter 14, the status information value of the DC/DC converter 14 is set to "10", and the second limiting rate β is set to 100%. During an overload state of the DC/DC converter 14, the status information value of the DC/DC converter 14 is set to "01", and the second limiting rate β is set to β1 (0%<β1<100%). During abnormal operation of the DC/DC converter 14, the status information value of the DC/DC converter 14 is set to "00", and the second limiting rate β is set to 0%. The second determination section 34 checks the status of the DC/DC converter 14 indicated by the inputted second signal Ssc2 against the second map 36, thereby determining the second limiting rate β.

As shown in FIG. 2, the current command value computation section 25 includes a first multiplier 37, a switching section 38, and a second multiplier 39. The first multiplier 37 multiplies the first limiting rate α determined by the first determination section 33 by the second limiting rate β determined by the second determination section 34, thereby computing a limiting rate γ. The first multiplier 37 is connected to the second multiplier 39 with the switching section 38. The determination section 32 ON/OFF controls the switching section 38 based on the limiting rate γ, which is the product of the first and second limiting rates α, β. Specifically, when determining that the first signal Ssc1 is disrupted, the determination section 32 outputs an ON signal to the switching section 38. When the switching section 38 is turned on, the limiting rate γ is inputted to the second multiplier 39 from the first multiplier 37. The second multiplier 39 multiplies the base assisting amount Ias* computed by the base assisting amount computation section 31 by the limiting rate γ, thereby computing the current command value Iq*, and outputs the current command value Iq* to the control signal output section 26.

That is, when the input of the first signal Ssc1 is disrupted, the current command value computation section 25 limits the current command value Iq* based on the value of the secondary voltage V2 detected by the voltage sensor 30 and the electricity supply state of the DC/DC converter 14 indicated by the second signal Ssc2. Based on the limited current command value Iq*, the current supplied to the EPS motor 12 is controlled. Therefore, the limited driving electricity is supplied to the EPS motor 12.

The above described embodiment provides the following advantages.

The DC/DC converter 14 outputs the second signal Ssc2, which indicates a state where the DC/DC converter 14 itself supplies electricity (status information), to the EPSECU 11. The EPSECU 11 includes the voltage sensor 30, which detects the value of the secondary voltage V2 supplied by the DC/DC converter 14. When the input of the first signal Ssc1, which indicates the electricity supply state of the high-voltage battery 13, is disrupted, the EPSECU 11 limits the driving electricity of the EPS motor 12 based on the value of the secondary voltage V2 detected by the voltage sensor 30 and the electricity supply state of the DC/DC converter 14 indicated by the second signal Ssc2. The EPSECU 11 supplies the limited driving electricity to the EPS motor 12.

Therefore, when the input of the first signal Ssc1 is disrupted, the driving electricity supplied to the EPS motor 12 is limited to a range in which no excessive load is applied to the high-voltage battery 13 and the DC/DC converter 14, that is, to a range in which the high-voltage battery 13 and the DC/DC converter 14 operates normally. Therefore, even if whether the high-voltage battery 13 is operating normally or abnormally cannot be checked due to disruption of the first signal Ssc1, the EPSECU 11 stably supplies the driving electricity to the EPS motor 12. As a result, the EPSECU 11 is capable of maintaining a favorable steering feel without stopping the power assist control.

It should be apparent to those skilled in the art that the present invention may be embodied in many other specific forms without departing from the spirit or scope of the invention. Particularly, it should be understood that the invention may be embodied in the following forms.

In the above embodiment, the present invention is applied to an electric power steering apparatus (EPS) of a high-voltage vehicle. However, the present invention may be applied to a motor of a device other then EPS, for example, to a motor of a variable gear ratio apparatus.

In the above described embodiment, when the input of the first signal Ssc1 is disrupted, the EPSECU 11 limits the driving electricity of the EPS motor 12 based on both of the value of the secondary voltage V2 detected by the voltage sensor 30 and the electricity supply state of the DC/DC converter 14 indicated by the second signal Ssc2. However, the EPSECU 11 may limit the driving electricity supplied to the EPS motor 12 based on only one of the value of the detected secondary voltage V2 and the electricity supply state of the DC/DC converter 14 indicated by the second signal Ssc2.

In the above embodiment, the EPSECU 11 multiplies the base assisting amount Ias* by the limiting rate γ, which is the product of the first and second limiting rates α, β, thereby limiting the driving electricity supplied to the EPS motor 12. However, the product of the first and second limiting rates α, β does not need to be used. For example, the driving electricity supplied to the EPS motor may be limited based on the sum of the first and second limiting rates α, β. In this case, it is configured that the sum of the first and second limiting rates α, β does not exceed 100%.

The present invention is not limited to a configuration in which the primary voltage V1 is stepped down by the DC/DC converter 14, but may be applied to a configuration in which a primary voltage is stepped up.

Therefore, the present examples and embodiments are to be considered as illustrative and not restrictive and the invention is not to be limited to the details given herein, but may be modified within the scope and equivalence of the appended claims.

What is claimed is:

1. An electric power steering apparatus installed in a vehicle having a primary power source that generates primary voltage, wherein the vehicle has a steering system and an in-vehicle network for communicating information, the electric power steering apparatus comprising:

a steering force assisting device that supplies assisting force for assisting steering operation to the steering system, wherein the assisting device has a steering motor serving as a driving source of the assisting force;

a transformer section that transforms the primary voltage and outputs secondary voltage; and a control section that controls the steering force assisting device by supplying driving electricity based on the secondary voltage to the steering motor, wherein the control section inputs a first signal indicating a state of electricity supply of the primary power source through the in-vehicle network, wherein the control section supplies driving electricity to the steering motor based on the first signal, wherein the transformer section outputs a second signal indicating a state of electricity supply of the transformer section, and wherein, when the input of the first signal is disrupted, the control section limits the driving electricity supplied to the steering motor based on at least one of a value of the secondary voltage and the electricity supply state of the transformer section indicated by the second signal.

2. An electric power steering apparatus installed in a vehicle having a primary power source that generates primary voltage, wherein the vehicle has a steering system and an in-vehicle network for communicating information, the electric power steering apparatus comprising:

a steering force assisting device that supplies assisting force for assisting steering operation to the steering system, wherein the assisting device has a steering motor serving as a driving source of the assisting force;

a transformer section that transforms the primary voltage and outputs secondary voltage; and a control section that controls the steering force assisting device by supplying driving electricity based on the secondary voltage to the steering motor, wherein the control section inputs a signal indicating a state of electricity supply of the primary power source through the in-vehicle network, wherein the control section supplies the driving electricity to the steering motor based on the signal, wherein the control section includes a detection section that detects a value of the secondary voltage and a determination section that determines a limiting rate of an amount of current supplied to the steering motor based on the value of the secondary voltage detected by the detection section, wherein, when the input of the signal is disrupted, the control section limits the driving electricity supplied to the steering motor based on the limiting rate determined by the determination section.

3. The electric power steering apparatus according to claim 2, wherein, as the secondary voltage detected by the detection section becomes lower, the control section determines the limiting rate in such a manner that the current amount supplied to the steering motor becomes smaller.

4. The electric power steering apparatus according to claim 2, wherein the signal is a first signal, and the transformer section outputs a second signal indicating a state of electricity supply of the transformer section, wherein the determination section is a first determination section, and the limiting rate is a first limiting rate, wherein the control section includes a second determination section that determines a second limiting rate of the current amount supplied to the steering motor based on the second signal, and wherein, when the input of the first signal is disrupted, the control section limits the driving electricity supplied to the steering motor based on the first and second limiting rates.

5. The electric power steering apparatus according to claim 4, wherein the control section limits the driving electricity supplied to the steering motor based on the product of the first and second limiting rates.

6. An electricity supply system installed in a vehicle having a primary power source that generates primary voltage, wherein the vehicle has a motor and an in-vehicle network for communicating information, the system comprising:

a transformer section that transforms the primary voltage and outputs secondary voltage;

a monitoring section that monitors a state of electricity supply of the primary power source, wherein the monitoring section outputs, to the in-vehicle network, a first signal indicating the electricity supply state of the primary power source; and a control section that supplies driving electricity based on the secondary voltage to the motor, wherein the control section inputs a first signal through the in-vehicle network, wherein the control section supplies driving electricity to the motor based on the first signal, wherein the transformer section outputs a second signal indicating a state of electricity supply of the transformer section, and wherein, when the input of the first signal is disrupted, the control section limits the driving electricity supplied to the motor based on at least one of a value of the secondary voltage and the electricity supply state of the transformer section indicated by the second signal.

* * * * *